(12) United States Patent
Keehn et al.

(10) Patent No.: US 7,914,835 B2
(45) Date of Patent: Mar. 29, 2011

(54) DOG CHEW TREATS

(75) Inventors: William Keehn, Perry, KS (US); Richard Rothamel, Zellenople, PA (US); Aretha Ashby, Long Beach, CA (US); Davor Juravic, San Pedro, CA (US); Franjo Baltorinic, Downey, CA (US); Yomayra Diaz, Downey, CA (US); Steven Bautista, Long Beach, CA (US); Donald Barnvos, Huntington Beach, CA (US); Tracy Wojnarowski, Long Beach, CA (US); Eric Lew, Los Angeles, CA (US)

(73) Assignee: Del Monte Corporation, San Francisco, CA (US)

( * ) Notice: Subject to any disclaimer, the term of this patent is extended or adjusted under 35 U.S.C. 154(b) by 1042 days.

(21) Appl. No.: 11/490,471

(22) Filed: Jul. 21, 2006

(65) Prior Publication Data
US 2007/0098841 A1    May 3, 2007

Related U.S. Application Data

(60) Provisional application No. 60/701,623, filed on Jul. 22, 2005.

(51) Int. Cl.
*A23L 1/00* (2006.01)
(52) U.S. Cl. ............ 426/516; 426/2; 426/302; 426/307; 426/512; 426/549; 426/805
(58) Field of Classification Search .............. 426/2, 549, 426/302, 307, 516, 512, 805
See application file for complete search history.

(56) References Cited

U.S. PATENT DOCUMENTS

| | | | | |
|---|---|---|---|---|
| 3,808,340 | A | * | 4/1974 | Palmer ............................ 426/92 |
| 4,029,823 | A | * | 6/1977 | Bone et al. ..................... 426/249 |
| 4,081,564 | A | * | 3/1978 | Borsuk ........................... 426/513 |
| 4,127,678 | A | * | 11/1978 | Burkwall, Jr. ................. 426/250 |
| 4,229,485 | A | * | 10/1980 | Brown et al. .................. 426/305 |
| 4,262,028 | A | * | 4/1981 | Meyer et al. .................. 426/417 |
| 4,524,081 | A | * | 6/1985 | Bansal ........................... 426/249 |
| 4,822,626 | A | * | 4/1989 | Spanier et al. .................. 426/94 |
| 4,837,112 | A | * | 6/1989 | Calandro et al. .............. 426/463 |
| 4,979,434 | A | * | 12/1990 | van Lengerich ................ 99/353 |

(Continued)

FOREIGN PATENT DOCUMENTS

CA    796683 A    * 10/1968

(Continued)

OTHER PUBLICATIONS

"Home Grown Doggie Treats", 21 pages, downloaded from internet archives at http://web.archive.org/web/20040622083859/www.doberdogs.com/hmgrown.html dated Jun. 30, 2004.*

*Primary Examiner* — C. Sayala
(74) *Attorney, Agent, or Firm* — Buchanan Ingersoll & Rooney PC

(57) ABSTRACT

A dog chew treat is fashioned from a composition comprising sugar, fiber, and flour. Preferably, the sugar is dextrose, and the flour is pre-gelatinized wheat flour. The composition may be molded into the shape of a bone, or other treat. A palatant coating may be applied to the molded product. Colors may be added for different aesthetics such as a marbling pattern. Functional ingredients may be used to provide health benefits.

8 Claims, 5 Drawing Sheets

U.S. PATENT DOCUMENTS

| | | | | |
|---|---|---|---|---|
| 4,997,671 A | * | 3/1991 | Spanier | 426/646 |
| 5,013,575 A | * | 5/1991 | Stadler et al. | 426/639 |
| 5,262,190 A | * | 11/1993 | Cunningham et al. | 426/549 |
| 5,532,010 A | * | 7/1996 | Spanier et al. | 426/94 |
| 6,228,418 B1 | * | 5/2001 | Gluck et al. | 426/623 |
| 6,261,620 B1 | * | 7/2001 | Leadbeater | 426/515 |
| 6,455,083 B1 | * | 9/2002 | Wang | 426/104 |
| 6,630,182 B1 | * | 10/2003 | Warrington et al. | 426/3 |

FOREIGN PATENT DOCUMENTS

| | | | | |
|---|---|---|---|---|
| CA | 1073260 | A | * | 3/1980 |
| GB | 1426257 | A | * | 2/1976 |
| GB | 1465267 | A | * | 2/1977 |
| GB | 2363966 | A | * | 1/2002 |

* cited by examiner

FIG. 16
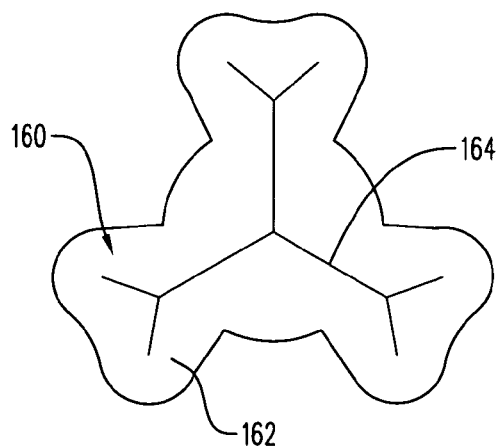
FIG. 17
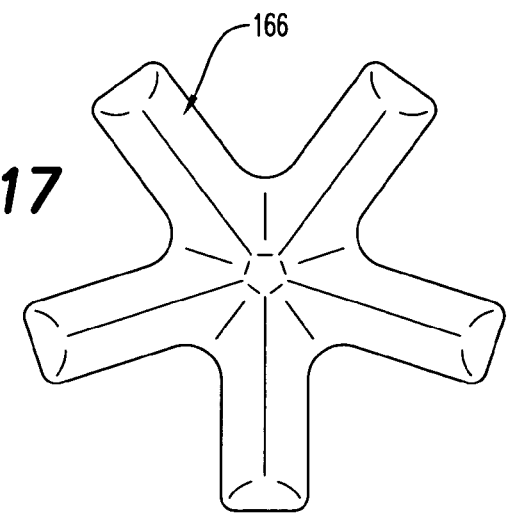
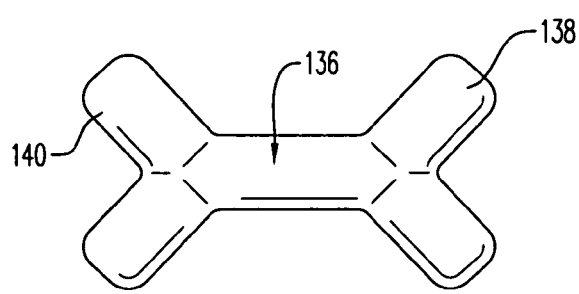
FIG. 18

DOG CHEW TREATS

CROSS-REFERENCE TO RELATED APPLICATION

This application is related to U.S. Provisional Patent Application Ser. No. 60/701,623, filed Jul. 22, 2005, for "Dog Chew Treats", which is incorporated herein by this reference thereto. This application is entitled to the benefit of that earlier filing date.

FIELD OF THE INVENTION

This invention relates generally to pet comestibles. In particular, the invention concerns chewable dog treats and a process for making them.

BACKGROUND OF THE INVENTION

Over the years, various compositions have been used for pet treats. For example, rawhide chew toys have long been known for pets such as dogs. Many other kinds of pet treats have also been known. The treats are often fabricated in interesting shapes intended to interest and/or amuse the pet. For example, treats are known that have been shaped like small pizzas, shaped like bones, shaped like small hams, and the like.

Some of those treats have been made from compositions that became sticky after the pet started to chew on them. Stickiness is not a desirable trait in dog treats for a variety of reasons. For example, if the dog tires of the treat and drops it, the pet owner's home furnishings may be damaged or soiled by the treat. Even if the partially consumed treat does not soil furnishings, the sticky treat may not be interesting to the pet at a later time and the sticky treat may then come into contact with clothing or other things in the dwelling and adhere to them. On occasion, treats have been so sticky that they adhere to the inside of the pet's mouth. Pets generally do not like such a sensation. For example, a pet may attempt to dislodge a sticky treat from its mouth using a paw thereby causing accidental injury to the inside of its mouth.

SUMMARY OF THE INVENTION

Chewable dog treats according to the invention preferably comprise a combination of flour, melted carbohydrate, and dietary fiber. The melted carbohydrate may be in the form of dextrose and functions to add hardness to the treat which increases chew time, as well as sweetness to the treat which is known to be pleasing to dogs. Inclusion of a quantity of dietary fiber materially reduces the stickiness of the treat during consumption as well as when the treat is only partially consumed. Melted carbohydrate also operates as a binder to hold the composition in a desired shape. Flour is a standard ingredient for dogs. In this application, flour adds texture to the product, reduces brittleness, helps absorb moisture, and develops firmness in the product.

Preferably, those three ingredients, namely flour, melted carbohydrate, and dietary fiber comprise about 90% of the dog treat, by weight. The remaining portion of the treat preferably comprises palatants, aromatic compounds, and/or functional components such as nutraceuticals, colorants, and preservatives. The palatants and aromatic compounds are selected to enhance the taste and smell of the treat thereby making the treat more pleasing and interesting to the dog. Functional ingredients can be added to provide a health benefit as the pet consumes the treat. One such functional ingredient may be an agent to reduce tartar build-up, or a nutritional ingredient for specific health claims. Likewise, colorants may be added to the pet treat for aesthetic appeal. Colors may be used to uniformly color the entire treat. Alternatively, color may be added to only a portion of the product to preserve the natural color of part of the product. In other arrangements, different colors can be used for different parts of the product (e.g., half and half) and colored patterns such as marbling may be provided. Preservatives may be added to improve the shelf life of the treat and to increase the length of time that the treat will be fresh for consumption by the pet. Suitable preservatives may be selected from the group consisting of mold inhibitors and antioxidants. Exemplary mold inhibitors include potassium sorbate. Exemplary antioxidants include butylated hydroxyanisol (BHA), and/or butylated hydroxytoluene (BHT).

The composition can be shaped as may be desired. Particularly suitable and interesting shapes (for dogs) are bones. Other possible shapes may reflect a functional benefit (tartar reduction), or selected to increase consumption time. Examples include brush shape, a bone with bristles/ridges to connote a brushing action on the teeth, or a sphere to make the product longer lasting.

BRIEF DESCRIPTION OF THE DRAWINGS

Many objects and advantages of the present invention will be apparent to those skilled in the art when this specification is read in conjunction with the drawing wherein like reference numerals are applied to like elements and wherein:

FIG. 16 is a plan view of a ninth embodiment of a molded chew treat;

FIG. 17 is a plan view of a tenth embodiment of a molded chew treat; and

FIG. 18 is a plan view of an eleventh embodiment of a molded chew treat.

DESCRIPTION OF THE ILLUSTRATED EMBODIMENTS

Figure 1:
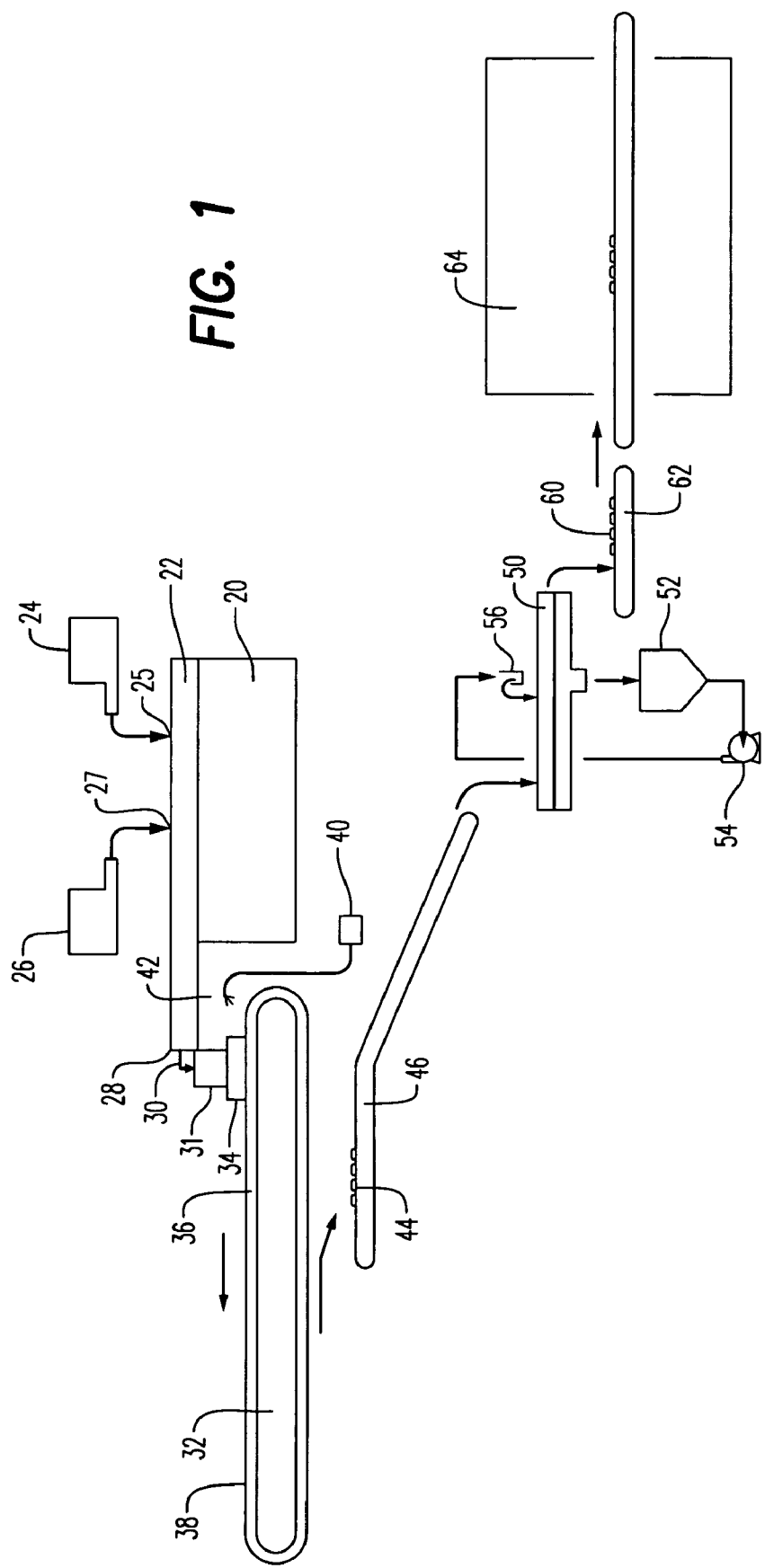
FIG. 1 is a schematic view of the process for making chew treats.

Turning to FIG. 1, a process for making the dog chew of this invention includes a suitable conventional extruder 20 having a pair of feed openings spaced along its barrel 22. The extruder 20 may, advantageously, comprise a twin-screw extruder having heating capability for the extruder barrel.

A first feeder 24 is located adjacent to the extruder 20 so that the first feeder 24 discharges a carbohydrate powder into a first feed opening 25 of the extruder 20. The carbohydrate may be dextrose, or another suitable sugar. For example, sugar may be selected from the group consisting of sucrose, dextrose, fructose, and blends of those sugars. Preferably, however, dextrose is selected as the sugar because dextrose provides strength without brittleness, is less prone to browning, and is not as sticky as sucrose. Moreover, dextrose can be used to seed crystallization during the cooling process. The first feeder 24 is also operable to meter the rate at which the carbohydrate is delivered to the extruder 20. The feeder 24 may, for example, comprise a conventional twin-auger feeder which is self-cleaning and operable to meter the carbohydrate delivery by regulation of the auger rotation rate. A twin-auger feeder is desirable because the carbohydrate can be delivered at a substantially constant, continuous rate.

A second feeder 26 is also positioned adjacent to the extruder barrel so that the feeder 26 discharges a dry mix into a second feed opening 27 of the extruder 20. For purposes of this invention, the preferred dry mix includes flour and dietary fiber. Suitable flour for this dog chew may be selected from the group consisting of flour, wheat flour, rice flour, corn flour, and pre-gelatinized versions of any of those types of flour. Preferably, pre-gelatinized flour may be used since it has been precooked. That precooked characteristic avoids additional cooking steps being needed and simultaneously avoids delivery of uncooked starches to the dog.

Suitable fibers for this dog chew include vegetable fiber, and synthetic fibers. Fiber is an important component of this dog chew. Fiber adds lubricity to the resulting product, and lubricity aids chewability. While the effect of fiber is not fully understood, it appears that the fiber absorbs saliva from the animal thereby reducing the availability of such moisture for hydrating sugar and flour.

If desired, other dry ingredients such as known palatants and known aromatic compounds that enhance interest to the dog may be included as part of the dry mix. Furthermore, known preservative compounds may also be added to the second feeder 26, if desired. Moreover, some crystalline sugar (up to about 1% by weight) may be included with the dry ingredients added at the second opening. Crystalline sugar added at this location may function as seed crystals during cooling to promote crystallization of the resulting product.

Other functional ingredients may also be used to provide a health benefit to the product. For example, a sequestrant such as sodium tripolyphosphate or sodium hexametaphosphate may be used to reduce the level of tartar build-up on the dog's teeth. Likewise, nutraceuticals may be added to deliver health benefits such as improvements in the pet's skin and coat, or improvements in the pet's breath, or support for the pet's immune system, or to provide joint care.

The feeder 26 preferably is operable to blend the dry ingredients and to meter the rate at which those dry ingredients are fed to the extruder 20.

The extruder 20 functions to mix and blend the dry ingredients as those ingredients advance toward the discharge end 28 of the extruder 20. In addition, the extruder 20 operates to blend the dry ingredients introduced at the second feeder 26 with the carbohydrate supplied by the first feeder 24. Operation of the screw inside the extruder 20 generates pressure and frictional heat, which may be augmented by external heat applied to the extruder barrel 22. The pressure and heat melt the carbohydrate so that the continued mixing with the dry mix inside the extruder barrel 22 creates an extrudate having a substantially uniform composition.

Where the carbohydrate used is dextrose, the temperature profile and screw configuration of the extruder 20 create sufficient temperature to melt the dextrose mono-hydrate (typically 250° F. to 280° F.) as the sugar is conveyed towards the extruder discharge 28. Preferably, however, external heat supplied by electrical heating is used to liquefy the carbohydrate. Approximately half-way down the extruder barrel, the dextrose may become completely liquefied. At this point, the dry blend ingredients blend into the now liquid dextrose. As noted above, the dry blend preferably comprises flour, dietary fiber, palatants, aromatic compounds, and/or preservatives. By way of example, the dry mix may comprise about 40% flour, about 2.5% fiber, about 4.5% flavorants, about 0.04% aromatic compounds, and less than about 0.01% preservatives. Color may be added with the dry blend, giving a uniform color to the product. Moreover, vitamins, minerals, and nutraceuticals may be added as may be desired.

The product leaves the extruder as a very hot (roughly 210° F.) semi-fluid, dough-like extrudate. The hot liquid extrudate 30 is delivered from the discharge end 28 of the extruder barrel 22 to a forming apparatus 32. If desired, the forming apparatus 32 may include a twin auger pump 31 to receive extrudate 30 from the discharge end 28 of the extruder barrel 22 and deliver the extrudate to a distribution manifold 34. If desired, a color solution can be pumped into the auger pump 31 downstream of the extruder barrel 22. With this arrangement, the color solution receives minimal mixing or coloration of the uncolored extrudate, giving the product a marbled appearance.

The distribution manifold 34 is operable to fill mold cavities 36 rotated by an endless conveyor arrangement 38. The apparatus 32 may include a belt carrying a plurality of molds. To enhance release of the molded treat from the mold cavities, an oil spray system 40 may be provided. Preferably, the oil spray system 40 includes a spray head 42 positioned to deliver release oil to the mold cavities just before the cavities move into registration with the distribution manifold 34.

After the mold cavity is filled with the hot extrudate, the endless conveyor 38 sequentially advances the mold blocks so that the extrudate can cool and solidify. That cooling step may occur by heat exchange with the environment or it may be mechanically accelerated by a fan or refrigeration system. As the carbohydrate (i.e., sugar or dextrose mono-hydrate) of the mixture cools below its melting point, the carbohydrate begins to recrystallize and the bone-shaped mixture becomes more solid. The rate of crystallization for the carbohydrate can be adjusted (i.e., increased or decreased) by either adding solid dextrose to the dry mix (typically 1%) or by varying the degree of melt of the separate sugar stream.

After the cooling step, the molded treats are removed from the mold cavities 36 in a conventional way. For example, a cam-operated push-rod may dislodge the molded treat from the associated cavity 36.

The formed treats 44 are then deposited on a transfer conveyor 46. That transfer conveyor 46 moves the treats to a coating station 50. The treats 44 move through the coating station 50 and may be coated with palatants and/or preservatives. The palatants and preservatives may be heated and applied along with water. The coating station 50 may include a reservoir 52 for the coating material being used. The coating material flows from the reservoir 52 to a pump 54 which delivers it to a coating trough 56 that creates a waterfall of the coating composition through which the formed treats 44 pass. Unused coating material drains back into the reservoir 52 where it can be recirculated. Alternately, the cooled, bone-shaped product is placed on a conveyor line where it is spray-coated with a heated mixture of water, palatants and preservatives. Thereafter, additional dry palatant may be sprinkled on the spray-coated, cooled, bone-shaped product, if desired.

The coated treats 60 are then deposited on a second transfer conveyor 62 that delivers them to a tunnel dryer 64. As the treats move through the tunnel dryer 64, the coating is dried and the treat becomes a finished product.

The resulting dog treat is a fully digestible dog chew which may simply be a treat, but could be used to deliver medication. The mold cavities 36 may be formed in the shape of bones and may be made in a variety of sizes, from small to large. Typically a treat occupies a dog's interest for an average of 20 minutes. Thus small bones may be offered for small dogs while larger bones may be offered for large dogs. When compared to rawhide and some other biopolymer chews, the dog treat of this invention offers several advantages, including being fully digestible and not lasting "too" long.

Preferably, the dog treat is a bone-shaped treat. The dog treat may also be basted by the coating applied at the coating station 50. The basic composition of bone itself is a white color, resultant from the sugar/flour mix used in its manufacture. The basting or coating may have a brown, gravy-like appearance.

Figure 2:
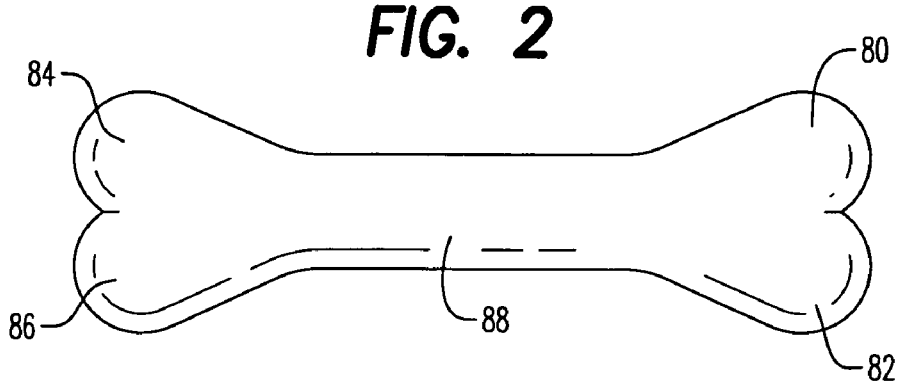
FIG. 2 is a plan view of a molded chew treat.
Figure 3:
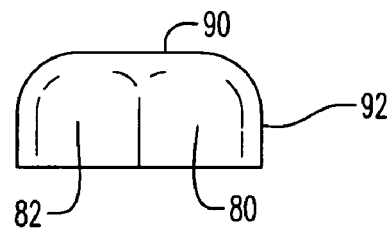
FIG. 3 is a right side view of the molded chew treat of FIG. 1.

Many different molded shapes for the treat are within the contemplation of this invention. See, for example, FIGS. 2-15. One preferred embodiment (see FIG. 2) is bone shaped having pairs of condyles 80, 82, 84, 86 disposed at opposed ends of an elongated central portion 88. The top surface 90 (see FIG. 3) of the bone-shaped treat is substantially flat or planar and the side surface 92 may be convergent upwardly to enhance mold release. The top surface 90 and the side surface 92 preferably meet with a generous fillet.

While many size options might be envisioned for this embodiment, three size options are currently preferred—large, small and mini. The large bone size may be about 5.75" long, about 2.5" wide across the condyles, with a depth of about 1.125". The large bone weighs about 210 grams each. The small bone size may have dimensions of about 4"×about 2"×about 0.85" (length×width×depth), with a weight of about 68 grams each. The mini bones would be smaller and lighter than the small bones. For example, the mini size may have dimensions of about 2.5"×about 1.75"×about 0.5" with a weight of about 28 grams. The composition of the large, small, and mini size bones would be the same. Typically the finished product should analyze with moisture below about 12%, fat about 2%, and protein about 5%.

Figure 4:
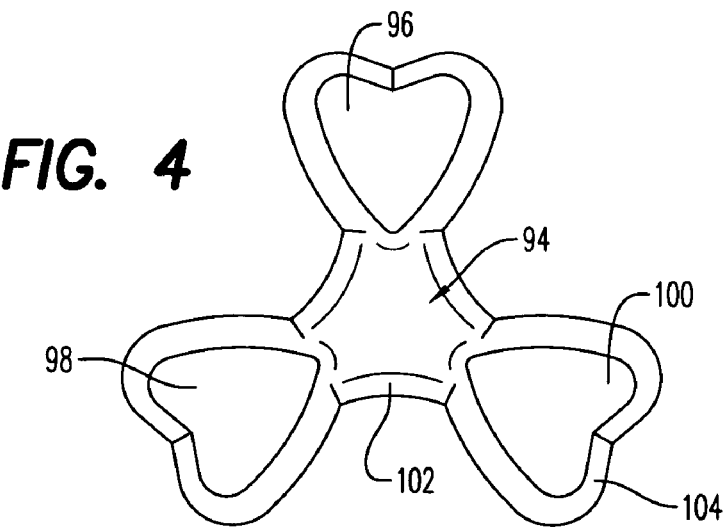
FIG. 4 is a plan view of a second embodiment of a molded chew treat.
Figure 5:
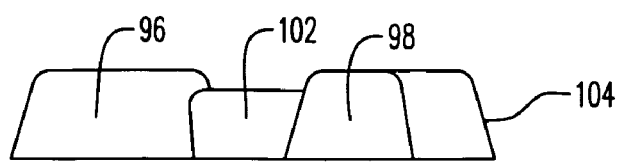
FIG. 5 is a left side view of the molded chew treat of FIG. 4.
Figure 6:
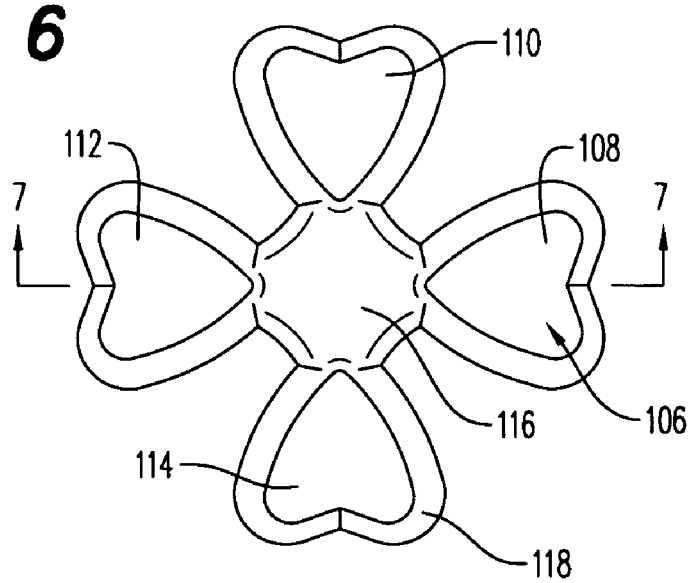
FIG. 6 is a plan view of a third embodiment of a molded chew treat.
Figure 7:
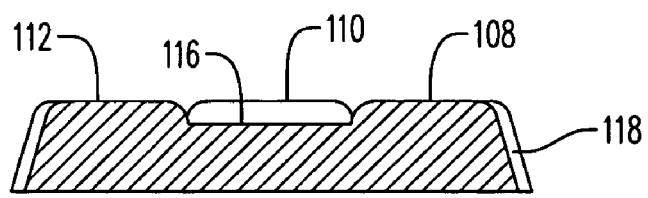
FIG. 7 is a cross-sectional view taken along the line 7-7 of FIG. 6.
Figure 8:
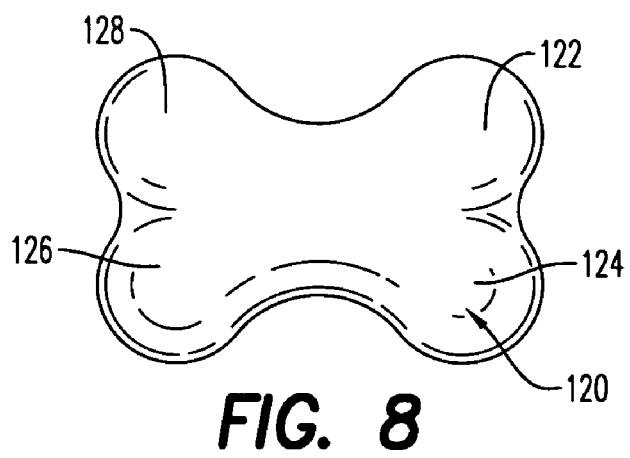
FIG. 8 is a plan view of a fourth embodiment of a molded chew treat.
Figure 9:
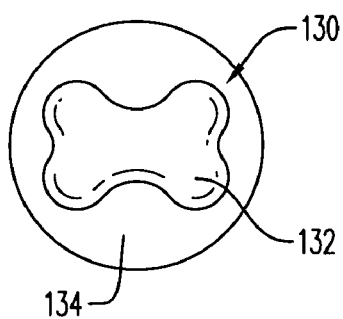
FIG. 9 is a plan view of a fifth embodiment of a molded chew treat.
Figure 10:
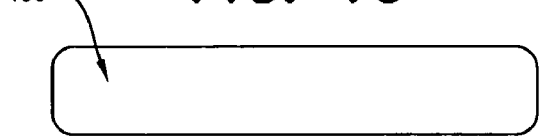
FIG. 10 is a plan view of a sixth embodiment of a molded chew treat.

Another embodiment for the dog treat may comprise a three-lobed, generally triangular, star shape 94 (see FIG. 4). Each lobe 96, 98, 100 has condylar attributes. To this end, each lobe may exhibit a general flat top surface (see FIG. 5). The lobes 96, 98, 100 are connected with a thinner central member 102. The sidewall 104 of the triangular shape 94 slope convergently upwardly toward the top surfaces of the lobes 96, 98, 100. With this arrangement, the entire treat can be offered to a pet, or one or two condylar lobes can be broken off and offered to the pet.

A similar cross-shaped embodiment for the dog treat 106 (see FIG. 6) includes four condylar lobes 108, 110, 112, 114, each connected to a central portion 116, and having a sidewall 118 sloping convergently upwardly. As with the embodiment of FIG. 4, the central portion 116 is thinner than the condylar lobes 108, 110, 112, 114 (see FIG. 7).

It is, of course, not required that a bone-shaped treat include a central portion. For example (see FIG. 8), the treat may comprise a plurality of conydlar lobes connected such that the treat is essentially a collection of condylar lobes 122, 124, 126, 128. Such an arrangement may be more suitable for smaller treats or for treats which are not intended to be broken or otherwise divided into smaller pieces.

The treat need not be molded as a bone-shaped article. For example (see FIG. 9) the treat 130 may be generally round or disk-shaped. If desired, letters, words, designs, symbols, or the like may be molded on the upper surface 134 of the treat 130. For example, a raised contour of a bone 132 might be used. The treat 136 might even, for example (see FIG. 10), have a stick-like shape. Such a shape could be straight as depicted or have branched ends 138, 140 as shown in FIG. 18.

Figure 11:
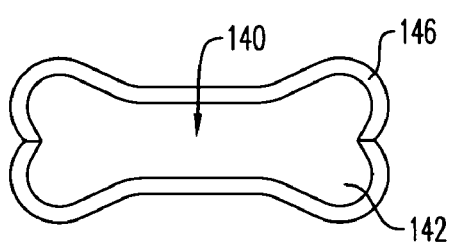
FIG. 11 is a plan view of a seventh embodiment of a molded chew treat.
Figure 12:
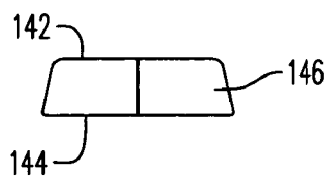
FIG. 12 is a right side view of the embodiment of FIG. 11.
Figure 13:
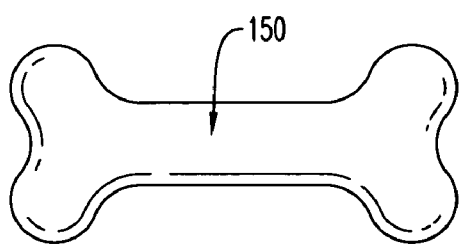
FIG. 13 is a plan view of an eighth embodiment of a molded chew treat.
Figure 14:
FIG. 14 is a right side view of the embodiment of FIG. 13.
Figure 15:
FIG. 15 is an alternate right side view of the embodiment of FIG. 13.

As depicted in FIGS. 11 and 12, the dog treat 140 may have substantially planar top and bottom surfaces 142, 144, that meet the sidewall 146 with relatively sharp corners. If desired, the bone-shaped treat 150 may have a sidewall 152 (see FIGS. 13 and 14) that is rounded such that little if any of the sidewall is straight or flat. Moreover, the sidewall 154 (see FIG. 15) may be flat for a substantial portion of the height with the top surface 156 being generally curved.

Turning to FIG. 16, another three-lobed dog treat configuration is shown in which the sidewall 162 extends upwardly to an edge 164 such that the treat is generally pyramidally shaped.

While it should be apparent that the overall shape of the dog treat described herein is not intended to be limiting, other geometric configurations such as the star treat 166 (see FIG. 17) may be used.

Preferably, the dog treat primarily constitutes a mixture of melted carbohydrate (specifically a sugar such as dextrose mono-hydrate), flour, and dietary fiber. These three ingredients comprise the vast majority of the formulation (roughly 90% by weight), with the remaining ingredients are selected from the group consisting of palatants, aromatic compounds, nutritionally functional ingredients, colorants, and preservatives.

As an alternative to the foregoing process, the treats can be manufactured by melting the carbohydrate (i.e., the sugar or dextrose mono-hydrate) separately and metering the already molten material into the extruder 20. The liquid sugar is then mixed with the dry blend throughout the length of the extruder to produce the same semi-fluid, dough-like extrudate 30.

The texture and color of the extrudate 30 can be adjusted by controlling the extruder 20. For example, by shortening the length of time the composition is processed by the extruder 20, less moisture is driven from the composition and the resulting product will be comparatively softer. Moreover, with higher residual moisture, the resulting extrudate has a greater handling time. Conversely, by increasing the length of time the composition is processed by the extruder 20, more moisture is driven from the composition, and the composition experiences some browning and becomes darker.

While the process described above is a substantially continuous process, dog treats having the desired composition discussed above may also be prepared using batch-type processes.

Addition of dietary fiber to the basic composition of flour and carbohydrate results in a dog chew treat with desirable properties. More specifically, the treat does not become sticky when the dog eats it.

Another alternative to the foregoing process involves coating the cooled, bone-shaped product with a raw-meat-based slurry in a dip-tank/flood-fill system. With this alternate coating step, the bone-shaped product requires subsequent oven drying.

To the extent that numerical values have been discussed above, it is intended that specific values be interpreted to include values within a tolerance of 5% of the stated value. To the extent that numerical values are introduced with the word "about", those values should also be interpreted to include values within a tolerance of 5%. Where percentage values are indicated, those percentage values are weight-based percentages and are subject to tolerances indicated above.

It will now be apparent to those skilled in the art that a new, useful, nonobvious dog chew treats has been disclosed. Moreover, it will be apparent to those skilled in the art that numerous modifications, variations, substitutions, and equivalents exist for various features of the invention that do not materially depart from the spirit and scope of the invention, as defined in the appended claims. Accordingly, it is expressly intended that all such modification, variations, substitutions and equivalents which fall within the spirit and scope of the appended claims be embraced thereby.

What is claimed is:

1. A process for making a pet treat comprising the steps of:
    delivering a carbohydrate to a first feed opening of an extruder, the extruder having a second feed opening downstream of the first feed opening, and a discharge opening downstream of the second feed opening;
    liquefying the carbohydrate in the extruder;
    delivering a dry mix to the second feed opening of the extruder, where the dry mix contains flour and dietary fiber;
    blending the dry mix and the liquefied carbohydrate in the extruder to form an extrudate; and
    molding the extrudate.

2. The process of claim 1 further including the step of applying a mold release agent to a mold prior to use of the mold for the molding step.

3. The process of claim 1 further including the steps of:
    sequentially delivering molds to a mold-filling device;
    cooling extrudate in the molds to form a molded product; and
    releasing the molded product from the molds.

4. The process of claim 3 further including the step of coating the molded product with a palatant.

5. The process of claim 3 further including the step of coating the molded product with a preservative.

6. The process of claim 3 further including the step of coating the molded product with a raw-meat-based slurry.

7. The process of claim 3 further including the step of mixing a colorant with the extrudate downstream of the extruder discharge so that the molded product is marbled.

8. The process of claim 1 further including the step of incorporating a nutraceutical in the extrudate.

* * * * *